(12) United States Patent
Matsunaga et al.

(10) Patent No.: US 8,186,914 B2
(45) Date of Patent: May 29, 2012

(54) ROTARY CUTTING TOOL

(75) Inventors: Makoto Matsunaga, Tokyo (JP);
Munehiro Nakamura, Tokyo (JP);
Shoichi Takahashi, Tokyo (JP)

(73) Assignee: Union Tool Co., Tokyo (JP)

( * ) Notice: Subject to any disclaimer, the term of this patent is extended or adjusted under 35 U.S.C. 154(b) by 434 days.

(21) Appl. No.: 12/444,659

(22) PCT Filed: Feb. 14, 2008

(86) PCT No.: PCT/JP2008/052462
§ 371 (c)(1),
(2), (4) Date: Apr. 7, 2009

(87) PCT Pub. No.: WO2008/132859
PCT Pub. Date: Nov. 6, 2008

(65) Prior Publication Data
US 2010/0008736 A1    Jan. 14, 2010

(30) Foreign Application Priority Data
Apr. 23, 2007   (JP) .................................. 2007-113581

(51) Int. Cl.
*B23C 5/10* (2006.01)
(52) U.S. Cl. ........................................... 407/54; 407/57
(58) Field of Classification Search .................... 407/53, 407/54, 57, 61–63
See application file for complete search history.

(56) References Cited

U.S. PATENT DOCUMENTS

| | | | | |
|---|---|---|---|---|
| 5,350,261 A | * | 9/1994 | Takaya et al. | 408/229 |
| 6,190,097 B1 | * | 2/2001 | Thomas | 408/230 |
| 2004/0067115 A1 | * | 4/2004 | Yamamoto | 408/230 |
| 2006/0275092 A1 | * | 12/2006 | Yamamoto | 408/230 |

FOREIGN PATENT DOCUMENTS

| | | |
|---|---|---|
| JP | 62-141413 U | 9/1987 |
| JP | 03-202218 A | 9/1991 |
| JP | 5-24220 U | 3/1993 |
| JP | 06-277926 A | 10/1994 |
| JP | 2000-84720 A | 3/2000 |
| JP | 2004-050349 A | 2/2004 |
| JP | 2004-209559 A | 7/2004 |
| JP | 2005-169600 A | 6/2005 |
| JP | 2005-297169 A | 10/2005 |
| JP | 2005-319538 A | 11/2005 |
| JP | 2007-030074 A | 2/2007 |

OTHER PUBLICATIONS

English Translation of the International Preliminary Report on Patentability dated Nov. 19, 2009 (6 pages).

(Continued)

*Primary Examiner* — Boyer D Ashley
*Assistant Examiner* — Sara Addisu
(74) *Attorney, Agent, or Firm* — Sughrue Mion, PLLC

(57) ABSTRACT

There is provided an exceptionally practical rotary cutting tool allowing the life of the tool to be prolonged. The rotary cutting tool has a plurality of helically shaped swarf discharge flutes (2) formed on a periphery of a tool body (1) from a leading end towards a trailing end, and a peripheral blade (4) formed on an intersecting ridgeline of a rake surface (3) of the swarf discharge flutes (2) and the peripheral surface of the tool body (1). A back taper part (B), on which an outside diameter (D1) of the peripheral blade (4) and an inside diameter (D2) of the tool body (1) gradually decrease from the leading end of the tool towards the trailing end, is provided to the leading end of the tool body (1).

4 Claims, 4 Drawing Sheets

OTHER PUBLICATIONS

Korean Office Action dated Apr. 4, 2011 for Korean Application No. 10-2009-7009427.

Japanese Office Action issued in Japanese Application No. 2007-113581 dated Dec. 6, 2010.

* cited by examiner

ROTARY CUTTING TOOL

TECHNICAL FIELD

The present invention relates to a rotary cutting tool.

BACKGROUND ART

There is disclosed, for example in Patent Document 1, a technique wherein a back taper is imparted to a peripheral blade of an end mill or other rotary cutting tool having a plurality of helically shaped swarf discharge flutes formed on the periphery of the tool body from a leading end of the tool toward a trailing end, and a peripheral blade formed on an intersecting ridgeline of a rake surface of the swarf discharge flutes and a peripheral surface of the tool body (giving a shape in which an outside diameter of the peripheral blade leading from the leading end of the tool toward the trailing end gradually decreases). As a result, the area where the peripheral blade contacts the article to be machined is reduced, the cutting resistance decreases, tool breakage or other deleterious effects are prevented, and the operating life of the tool is prolonged.

[Patent Document 1] Japanese Laid-open Patent Publication No. 2004-209559

DISCLOSURE OF THE INVENTION

Problems the Invention is Intended to Solve

However, on having conducted a variety of experiments, the present inventors confirmed that even the technique disclosed in Patent Document 1 has an inadequate action in terms of preventing tool breakage or other deleterious effects, and does not adequately prolong the operating life of the tool. Upon further investigation, the present inventors discovered that the operating life of the tool remains inadequately prolonged due to the following points.

Specifically, as illustrated in FIGS. 1 and 2, an inside diameter d of a conventional tool body a (the diameter of a circle that connects the bottom of the swarf discharge flutes) is configured to remain the same (FIG. 1) or to gradually increase from the leading end of the tool towards the trailing end (FIG. 2). When a back taper is imparted to a peripheral blade b, the taper profile of the peripheral blade b and the inside diameter d (the direction and degree of tapering) are not fixed. Therefore, the rake angle of the peripheral blade b is not fixed, but becomes more obtuse towards the trailing end of the tool, and the cutting performance will decline, which the inventors discovered to be a cause of tool breakage. The reference symbol c in the drawings designates a taper part connectively provided to a shank.

The present invention was devised in light of the above circumstances, and provides an exceptionally practical rotary cutting tool in which the taper profiles of the peripheral blade and the inside diameter are made to match. As a result, the rake angles of the peripheral blades can be fixed at a desired angle, cutting can be satisfactorily performed on the trailing end of the peripheral blades without the rake angles of the peripheral blades becoming obtuse towards the trailing end of the tool, the tool will not get damaged as a result of reduced cutting performance on the trailing end of the peripheral blades, and the life of the tool can be prolonged.

Means for Solving the Problems

The main points of the present invention are described below with reference to the attached drawings.

A rotary cutting tool having a plurality of helically shaped swarf discharge flutes 2 formed on a periphery of a tool body 1 from a leading end towards a trailing end, and having a peripheral blade 4 formed on an intersecting ridgeline of a rake surface 3 of the swarf discharge flutes 2 and the peripheral face of the tool body 1; the rotary cutting tool characterized in that a back taper part B, on which an outside diameter D1 of the peripheral blade 4 and an inside diameter D2 of the tool body 1 gradually decrease from the leading end of the tool towards the trailing end, is provided to the leading end of the tool body 1, and the degree to which the outside diameter D1 of the peripheral blade 4 gradually decreases is set to be substantially the same as the degree to which the inside diameter D1 of the tool body 1 on the back taper part B gradually decreases.

The rotary cutting tool according to the first aspect, wherein the rotary cutting tool is characterized in that a length of the back taper part B is established to lie within a range from 50% to 300% of a maximum outside diameter of the peripheral blade 4.

The rotary cutting tool according to the second aspect, wherein the rotary cutting tool is characterized in that a front taper part F, on which the outside diameter D1 of the peripheral blade 4 and the inside diameter D2 of the tool body 1 both gradually increase from the leading end of the tool towards the trailing end, is provided on the tool body 1 from the back taper part B toward the trailing end of the tool.

The rotary cutting tool according to the third aspect, wherein the rotary cutting tool is characterized in that, on the front taper part F, a degree to which the outside diameter D1 of the peripheral blade 4 gradually increases is set to be substantially the same as a degree to which the inside diameter D2 of the tool body 1 gradually increases.

The rotary cutting tool according to the second aspect, wherein the rotary cutting tool is characterized in that a bottom blade 6a, 6b is provided on each intersecting ridgeline of the rake surfaces 3 of the swarf discharge flutes 2 and a leading end flank face 5 of the tool body 1; and a concave angle α of the bottom blade 6a, 6b is set to 5° to 25°.

The rotary cutting tool according to the second aspect, wherein the rotary cutting tool is characterized in that the peripheral blade 4 and a bottom blade 6a, 6b provided on each intersecting ridgeline of the rake surface 3 of the swarf discharge grooves 2 and a leading end flank face 5 of the tool body 1 are disposed at non-equivalent spacing along the circumferential direction of the tool body 1.

Effect of the Invention

The present invention is configured as described above, and is therefore an exceptionally practical rotary cutting tool, in which the rake angles of the peripheral blades can be fixed at a desired angle, and with which cutting can be satisfactorily performed on the trailing end of the peripheral blades without the rake angles of the peripheral blades becoming obtuse towards the trailing end of the tool. No damage to the tool occurs as a result of reduced cutting performance on the trailing end of the peripheral blades, and the life of the tool can be prolonged.

BEST MODE FOR CARRYING OUT THE INVENTION

Figure 1:
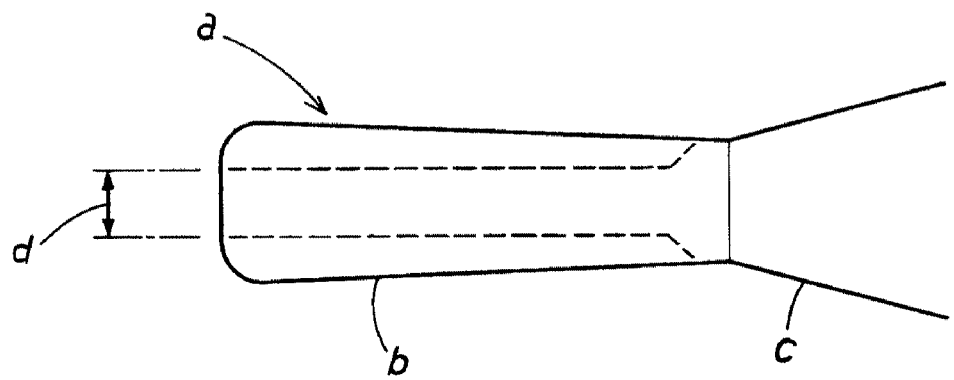
FIG. 1 is a schematic side view of an example of a conventional tool.
Figure 2:
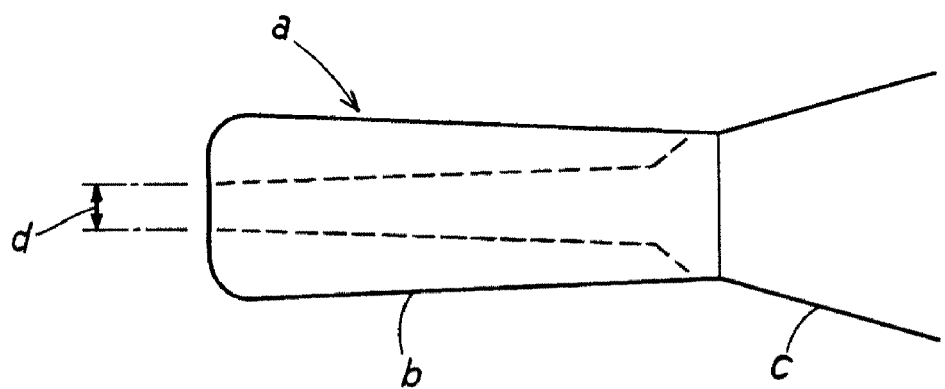
FIG. 2 is a schematic side view of an example of a conventional tool.

Preferred embodiments of the present invention are briefly described below with reference to the drawings while indicating the action of the present invention.

There is provided to a leading end of a tool body 1 a back taper part B on which an outside diameter D1 of a peripheral blade 4 and an inside diameter D2 of the tool body 1 gradually decrease from a leading end the tool toward a trailing end (imparting a back taper to the outside diameter D1 of the peripheral blade 4 and the inside diameter D2 of the tool body 1), whereby the taper profile of the outside diameter D1 of the peripheral blade 4 matches that of the inside diameter D2 of the tool body 1, the rake angle of the peripheral blade 4 from the leading end to the trailing end can be fixed and a desired rake angle continually maintained, and favorable cutting performance of the peripheral blade 4 can be kept even at the trailing end. Accordingly, it shall be apparent that the trailing end of the peripheral blade is of a small diameter and the surface area coming into contact with the article to be machined can be reduced. The conventional problem of diminished cutting performance at the trailing end of the peripheral blade can be resolved, and the operating life of the tool can be prolonged.

EXAMPLES

Specific embodiments of the present invention are described below with reference to FIGS. 3 to 7.

The present embodiment is a rotary cutting tool having a plurality of helically shaped swarf discharge flutes 2 formed on a periphery of a tool body 1 from a leading end towards a trailing end, and having a peripheral blade 4 formed on an intersecting ridgeline of a rake surface 3 of the swarf discharge flutes 2 and the peripheral face of the tool body 1. There is provided to the leading end of the tool body 1 a back taper part B, on which an outside diameter D1 of the peripheral blade 4 and an inside diameter D2 of the tool body 1 gradually decrease from the leading end of the tool towards the trailing end.

Figure 3:
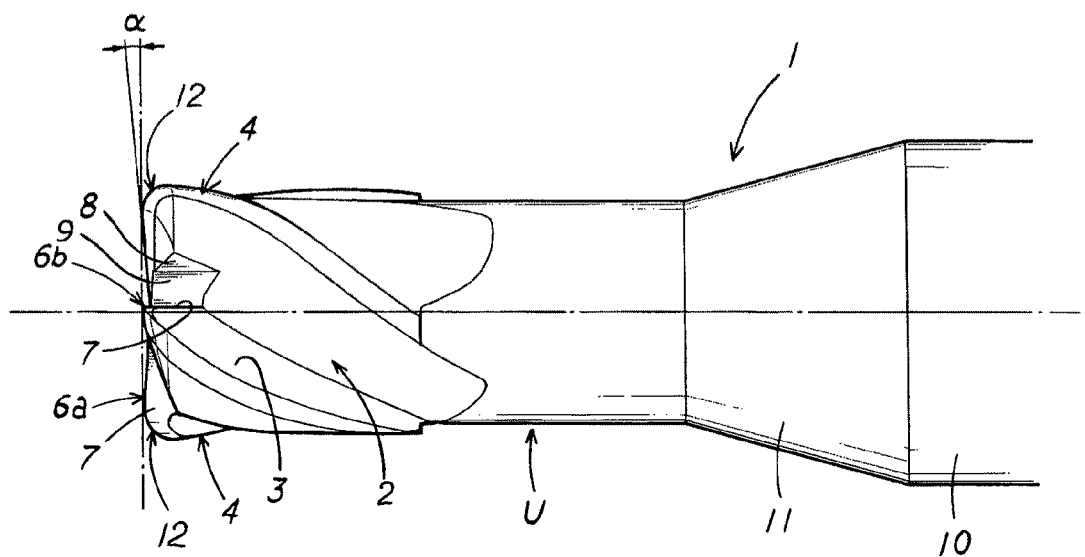
FIG. 3 is a schematic side view of the structure of the present embodiment.
Figure 4:
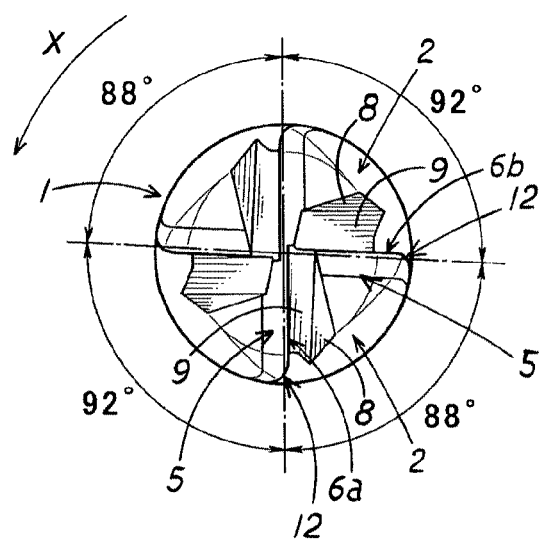
FIG. 4 is a schematic elevational view of the structure of the present embodiment.

Specifically, as shown in FIGS. 3 and 4, the present embodiment is a four-bladed radius-end mill wherein bottom blades 6a, 6b having cutting edges are provided on each of the intersecting ridgelines of (gash faces 7 provided to the leading ends of) the rake surfaces 3 of the swarf discharge flutes 2 and leading end flank faces 5 of the tool body 1. The radius-end mill has a shank part 10 for connecting a tool attachment part of a milling machine to the trailing part, and is used to perform flat machining, 3D machining, or other cutting work on steel materials and other metals attached to the milling machine.

In the drawings, the reference symbol 8 is a gash-facing face facing the gash surface 7 provided to the leading end of the rake surface 3, the reference symbol 9 is a gash bottom surface connectively provided between the gash surface 7 and the gash-facing face 8, the reference symbol 11 is a taper part connectively provided between the shank part 10 and an undercut part U, and the reference symbol 12 is a corner R blade connectively provided between the peripheral blade 4 and the bottom blade 6a, 6b.

Each of the parts will be described in detail below.

Two of four swarf discharge flutes 2 having rake surfaces 3 that form the bottom blade 6a (main cutting edge), are provided at 92° intervals in relation to the swarf discharge flutes rearward in the rotational direction; and two of the four swarf discharge flutes 2 having rake surfaces 3 that form the bottom blade 6b (sub cutting edge), are provided at 88° intervals in relation to the swarf discharge flutes rearward in the rotational direction (see FIG. 4). The letter 'X' in the drawings is the direction in which the tool rotates.

Each of the four peripheral blades 4 and the four bottom blades 6a, 6b is provided at intervals that are identical to the intervals of the swarf discharge flutes 2.

Specifically, the peripheral blades 4 and the bottom blades 6a, 6b are disposed at non-equivalent spacing along the circumferential direction of the tool body 1. Accordingly, the main cutting edge is 2° ahead of the sub cutting edge in the rotational direction, whereby the cutting resistance of the main cutting edge decreases, and chatter is minimized.

Also, a concave angle α of the bottom blades 6a, 6b is favorably set to 5° to 25°. In the present embodiment the concave angle α is set to 10°. Therefore, a larger concave angle α correspondingly reduces the cutting resistance of the leading end of the tool, and the moment load applied to the tool during cutting can be lessened.

Figure 5:
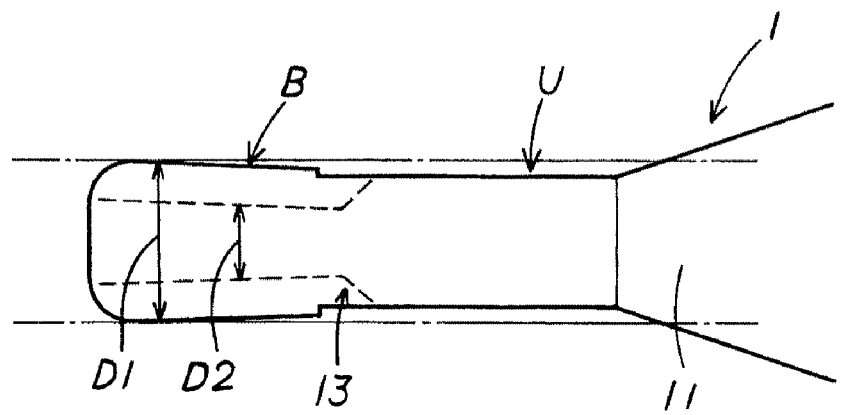
FIG. 5 is a schematic side view of the present embodiment.

As shown in FIG. 5, the present embodiment has a construction wherein a blade part having the peripheral blades 4 forms a back taper part B, and the blade part and the tapering part 11 are connectively provided at an undercut part U that is not formed from the peripheral blades 4 and has a smaller diameter than the blade part. The present embodiment is configured so that, on the back taper part B, the degree to which the outside diameter D1 of the peripheral blades 4 gradually decreases is set to be substantially the same as the degree to which the inside diameter D2 of the tool body 1 gradually decreases.

Specifically, in the back taper part B illustrated in FIG. 5, the angles of decline in relation to the axial center of the tool (taper half-angles) from the left side to the right side of the outside diameter D1 of the peripheral blades 4 and the inside diameter D2 are set to be substantially the same. Specifically, the taper half-angles are preferably set within the range of 0.5° to 1.5° because at 0.5° or less a diminishing effect on the cutting resistance is notably absent, and at 1.5° or greater strength is excessively reduced. However, the blade length and the range over which the back taper part B is provided are also determining factors. In the present embodiment, the taper half angles of the outside diameter D1 of the peripheral blades 4 and the inside diameter D2 are set to 1°.

Accordingly, not only do the outside diameter D1 of the peripheral blades 4 and the inside diameter D2 have a back taper profile; but in the back taper part B the difference between the outside diameter D1 of the peripheral blades 4 and the inside diameter D2 remains constant, and the rake angles of the peripheral blades 4 also remain constant. Moreover, the cutting property remains constant without cutting performance decreasing towards the trailing end, as conventionally seen, and damage to the tool is correspondingly minimized.

Specifically, the back taper part B is provided from a trailing end of a corner R blade 12 to the leading end of the undercut part U. The corner R blade 12 is connectively provided between the peripheral blades 4 and the bottom blades 6a, 6b formed on the leading end of the tool body 1.

Specifically, the peripheral blades 4 are constructed so that the outside diameter D1 gradually decreases from the trailing end of the corner R blade 12 to the leading end of the undercut part U. The inside diameter D2 is configured so as to gradually decrease leading from the leading end of the tool to the trailing end. The region where both the outside diameter D1 and the inside diameter D2 gradually decrease is established on the back taper part B. The rising portion 13 on the tool trailing-end of the dotted line showing the inside diameter D2 is a portion corresponding to a grindstone transfer mark when grinding of the flutes has concluded.

The length of the back taper part B is preferably established to lie within a range from 50% to 300% of the maximum outside diameter of the peripheral blades 4 because when the length is less than 50% of the maximum outside diameter of the peripheral blades 4, the effect of a reduced cutting resistance is slight, while when the length is 300% or more of the maximum outside diameter of the peripheral blades 4, strength is excessively reduced. However, the blade length and the taper half-angle are also determining factors. In the present embodiment, the length of the back taper part B is established to lie in the range of approximately 100% of the maximum outside diameter of the peripheral blades 4.

In a case in which the inside diameter D2 gradually decreases from the leading end of the tool to the trailing end when using a long-bladed tool that is not provided with an undercut part U of the type provided in the present embodiment and that has an increased blade length, the second moment of inertia of a base part of the blade part will inevitably decrease, and the strength of the tool will decline. The reduction in strength becomes pronounced when the blade length is 200% or more of the tool outside diameter (the maximum outside diameter of the peripheral blade 4).

Figure 6:
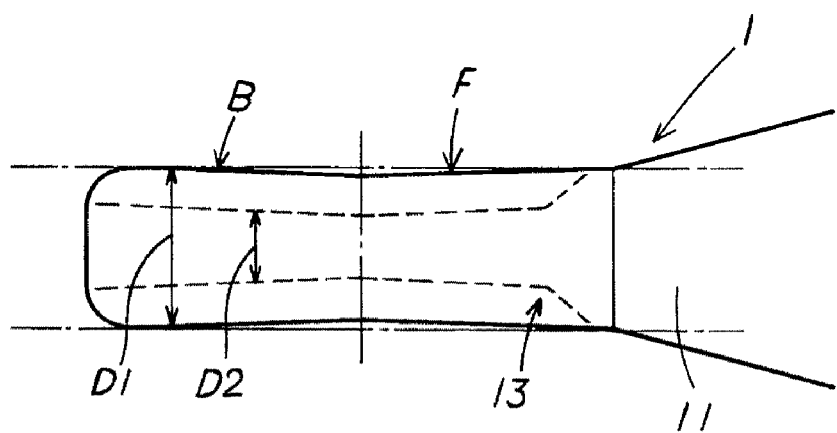
FIG. 6 is a schematic side view of another example according to the present invention.
Figure 7:
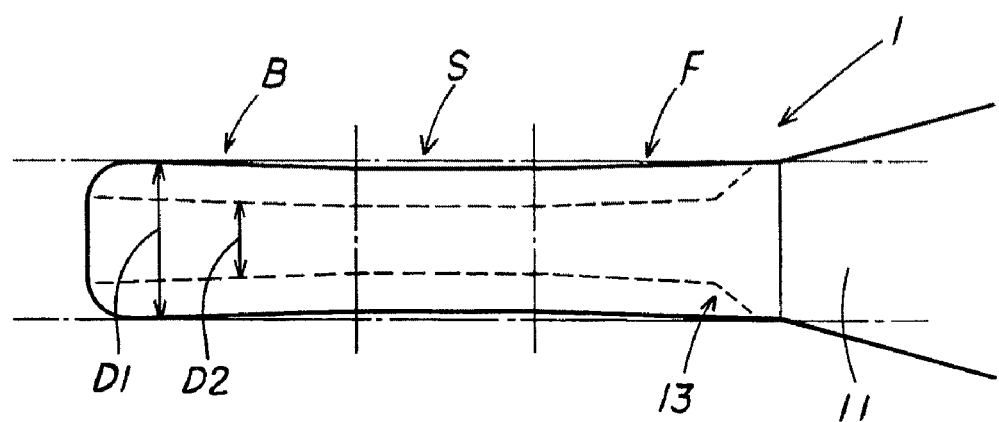
FIG. 7 is a schematic side view of another example according to the present invention.

As a result, in this case a front taper part F, on which the outside diameter D1 of the peripheral blades 4 and the inside diameter D2 of the tool body 1 both gradually increase from the leading end of the tool towards the trailing end, is provided on the tool body from the back taper part toward the trailing end of the tool (see FIGS. 6 and 7). In a case in which the front taper part F is thus provided to the trailing end of the tool, the inside diameter D2 of the trailing end will be larger than in cases where the front taper part F is not provided, and the rigidity will be correspondingly improved.

Also, for the same reasons relating to the back taper part B, on the front taper part F of the present embodiment, the degree to which the outside diameter D1 of the peripheral blades 4 gradually increases is set to be substantially the same as the degree to which the inside diameter D2 of the tool body 1 gradually increases. The taper half-angle in the front taper part F may be set within the range in which the outside diameter of the gradually increased trailing part of the tool is equivalent to or less than the outside diameter D1 of the peripheral blades 4 of the leading end part of the tool.

Specifically, FIG. 6 shows an example in which the back taper part B is provided to the leading end of the blade part, the front taper part F is provided to the trailing end of the blade part, and the blade part is substantially divided into two parts by the back taper part B and the front taper part F. In FIG. 6, the back taper part B is provided from the trailing end position of the corner R blade 12 to substantially the center position of the blade part. The front taper part F is provided from substantially the center position of the blade part (the trailing position of the back taper part B) to the leading end position of the rising portion 13 of the inside diameter D2.

FIG. 7 shows an example in which there is provided a straight part S wherein the outside diameter D1 of the peripheral blades 4 and the inside diameter D2 remain fixed between the back taper part B and the front taper part F. Longer blades in particular will have fewer regions where the back and front tapers need to be processed, and an advantage will be presented in that machining tasks are correspondingly facilitated. In FIG. 7, the back taper part B is provided from the trailing end position of the corner R blade 12 to the leading end position of the straight part S. The straight part S is provided from the trailing end position of the back taper part B to the leading end position of the front taper part F. The front taper part F is provided from the trailing end position of the straight part S to the leading end position of the rising part 13 of the inside diameter D2.

A detailed description of the present embodiment has been provided for a four-blade radius-end mill; however, the same description will apply to square-end mills or ball-end mills, and even to end mills having either three or fewer blades or five or more blades.

Peripheral flank faces that form the peripheral blades 4 and the rake surfaces 3 of the swarf discharge flutes 2 may be provided on the periphery of the tool body 1.

The present embodiment is constituted as described above, and accordingly there is provided to a leading end of a tool body 1 a back taper part B on which an outside diameter D1 of a peripheral blade 4 and an inside diameter D2 of the tool body 1 gradually decrease from a leading end the tool toward a trailing end (imparting a back taper to the outside diameter D1 of the peripheral blade 4 and the inside diameter D2 of the tool body 1), whereby the taper profile of the outside diameter D1 of the peripheral blade 4 matches that of the inside diameter D2 of the tool body 1, the rake angle of the peripheral blade 4 from the leading end to the trailing end can be fixed and a desired rake angle continually maintained, and favorable cutting performance of the peripheral blade 4 can be kept even at the trailing end. Accordingly, it shall be apparent that the trailing end of the peripheral blade is of a small diameter and the surface area coming into contact with the article to be machined can be reduced. The conventional problem of diminished cutting performance at the trailing end of the peripheral blade can be resolved, and the operating life of the tool can be prolonged.

Further, in the present embodiment, a larger concave angle is used and the peripheral blades 4 and the bottom blades 6a, 6b are disposed at non-equivalent spacing, whereby the load received by the tool body 1 when cutting is performed is as small as possible, tool damage is minimized, and the life of the tool can be extended.

Accordingly, the present embodiment is an exceptionally practical rotary cutting tool, in which the rake angles of the peripheral blades can be fixed at a desired angle, and with which cutting can be satisfactorily performed on the trailing end of the peripheral blades without the rake angles of the peripheral blades becoming obtuse towards the trailing end of the tool. No damage to the tool occurs as a result of reduced cutting performance on the trailing end of the peripheral blades, and the life of the tool can be prolonged.

The invention claimed is:

1. A rotary cutting tool having a plurality of helically shaped swarf discharge flutes formed on a periphery of a tool body from a leading end towards a trailing end, and having a peripheral blade formed on an intersecting ridgeline of a rake surface of the swarf discharge flutes and a peripheral face of the tool body; the rotary cutting tool characterized in that a back taper part, on which an outside diameter of the peripheral blade and an inside diameter of the tool body gradually decrease from the leading end of the tool towards the trailing end, is provided to the leading end of the tool body, and the degree to which the outside diameter of the peripheral blade gradually decreases is set to be substantially the same as the degree to which the inside diameter of the tool body on the back taper part gradually decreases, the length of the back taper part is set within a range of 50% to 300% of the maximum diameter of the peripheral blade, the peripheral blade and a bottom blade provided on each intersecting ridgeline of the rake surface of the swarf discharge grooves and a leading end flank face of the tool body are disposed at non-equivalent spacing along the circumferential direction of the tool body.

2. The rotary cutting tool according to claim 1, wherein the rotary cutting tool is characterized in that a front taper part, on which the outside diameter of the peripheral blade and the inside diameter of the tool body both gradually increase from the leading end of the tool towards the trailing end, is provided on the tool body from the back taper part toward the trailing end of the tool.

3. The rotary cutting tool according to claim 2, wherein the rotary cutting tool is characterized in that, on the front taper part, a degree to which the outside diameter of the peripheral blade gradually increases is set to be substantially the same as a degree to which the inside diameter of the tool body gradually increases.

4. The rotary cutting tool according to claim 1, wherein the rotary cutting tool is characterized in that a concave angle of the bottom blades is set to 5° to 25°.

* * * * *